United States Patent
Wang (10) Patent No.: US 9,284,058 B2
(45) Date of Patent: Mar. 15, 2016

(54) CONVERTIPLANE

(75) Inventor: James Wang, Samarate (IT)

(73) Assignee: AGUSTAWESTLAND S.P.A., Samarate (IT)

( * ) Notice: Subject to any disclaimer, the term of this patent is extended or adjusted under 35 U.S.C. 154(b) by 205 days.

(21) Appl. No.: 13/560,182

(22) Filed: Jul. 27, 2012

(65) Prior Publication Data

US 2013/0026304 A1 Jan. 31, 2013

(30) Foreign Application Priority Data

Jul. 29, 2011 (EP) ..................................... 11425209

(51) Int. Cl.
*B64D 27/24* (2006.01)
*B64C 29/00* (2006.01)

(52) U.S. Cl.
CPC ............ *B64D 27/24* (2013.01); *B64C 29/0033* (2013.01); *Y02T 50/64* (2013.01)

(58) Field of Classification Search
CPC .................................................. B64C 29/0033
USPC ............. 244/7 R, 7 A, 12.2, 12.4, 12.5, 23 A, 244/23 B, 23 C, 23 D
See application file for complete search history.

(56) References Cited

U.S. PATENT DOCUMENTS

| | | | |
|---|---|---|---|
| 3,335,977 A | | 8/1967 | Meditz |
| 3,592,412 A | * | 7/1971 | Glatfelter ....................... 244/7 A |
| 3,797,783 A | * | 3/1974 | Kisovec ......................... 244/7 A |
| 4,691,878 A | * | 9/1987 | Vaughan et al. ............... 244/7 R |
| 4,979,698 A | * | 12/1990 | Lederman ....................... 244/7 R |
| 5,031,858 A | * | 7/1991 | Schellhase et al. ............ 244/7 R |
| 6,607,161 B1 | * | 8/2003 | Krysinski et al. .............. 244/7 A |
| 7,789,341 B2 | * | 9/2010 | Arlton et al. ............... 244/17.23 |
| 7,871,033 B2 | * | 1/2011 | Karem et al. .................. 244/7 A |
| 7,874,513 B1 | * | 1/2011 | Smith .......................... 244/12.4 |
| 8,016,226 B1 | * | 9/2011 | Wood ........................... 244/23 A |
| 8,066,219 B2 | * | 11/2011 | Patt et al. ...................... 244/12.4 |
| 8,500,062 B2 | * | 8/2013 | Brunken, Jr. ............... 244/17.11 |
| 2010/0038473 A1 | | 2/2010 | Schneider et al. | |

FOREIGN PATENT DOCUMENTS

| | | |
|---|---|---|
| WO | WO 2010/137016 | 12/2010 |
| WO | WO 2011/023396 | 3/2011 |

* cited by examiner

*Primary Examiner* — Brian M O'Hara
*Assistant Examiner* — Keith L Dixon
(74) *Attorney, Agent, or Firm* — Leason Ellis LLP (57) ABSTRACT

There is described a convertiplane comprising: a pair of semi-wings; a first rotor comprising a shaft which may rotate about first axis and tilt about a second axis together with first axis with respect to semi-wings between a helicopter mode and an aeroplane mode; first axis being transversal to a longitudinal direction of convertiplane in helicopter mode and being substantially parallel to longitudinal direction in aeroplane mode; convertiplane also comprises an electrical power storage device; and an electrical machine which comprises, in turn: a stator electrically connected to storage device; and a second rotor operatively connected to a shaft of first rotor; electrical machine acts as an electric motor for driving in rotation said first rotor by using the electrical power stored in storage device; or as an electrical power generator for recharging storage device by causing the rotation second rotor under the action of a wind current.

12 Claims, 10 Drawing Sheets

CONVERTIPLANE

The present invention relates to a convertiplane, i.e. a hybrid aircraft with adjustable rotors, capable of selectively assuming an "aeroplane" configuration, in which the rotors are positioned with their axes substantially parallel to the longitudinal axis of the aircraft, and a "helicopter" configuration, in which the rotors are positioned with their axes substantially vertical and crosswise to the longitudinal axis of the aircraft, so as to combine the advantages of a fixed-wing turboprop aircraft and a helicopter.

The ability to adjust its rotors as described enables a convertiplane to take off and land like a helicopter, i.e. with no need for a runway and along extremely steep trajectories, to minimize ground noise and, for example, even take off and land in urban areas; and to fly like an aeroplane capable of reaching and maintaining a cruising speed of roughly 500 km/h, or at any rate higher than the roughly 300 km/h cruising speed of a helicopter, and a typical cruising height of 7500 meters, which is roughly twice that of a helicopter, and enables it to fly above most cloud formations and atmospheric disturbance.

In other words, with respect to a conventional helicopter, a convertiplane has the advantages of almost twice the cruising speed; substantially twice the flying distance and time for a given payload and fuel supply, thus making it cheaper to operate; and over twice the cruising height, thus making it insensitive to weather conditions (clouds, turbulence) over most of the flight. With respect to a conventional aeroplane, on the other hand, a convertiplane has the advantages of being able to hover, and to take off and land in confined spaces, even in urban areas.

BACKGROUND OF THE INVENTION

Known convertiplanes substantially comprise a fuselage, a pair of semi-wings projecting on opposite lateral sides of the fuselage, and a pair of nacelles which house relative rotors and rotate, together with relative rotors, relative to respective semi-wings.

Each nacelle houses a relative motor-rotor assembly, which, therefore, rotates together with the nacelle relative to the corresponding semi-wing.

In detail, each nacelle comprises:
a gas turbine; and
a mechanical transmission which mechanically connects the gas turbine with the relative rotor.

Each mechanical transmission is adapted to convert the higher rotation speed of the gas turbine into the lower rotation speed need for an efficient operation of the rotors.

To this purpose, the mechanical transmission comprises a plurality of gearbox, shafts and bearing.

As a result, the mechanical transmission increases the weight, the complexity and the maintenance requirements of the convertiplane.

In order to reduce all the above-indicated drawbacks which are connected with the presence of the mechanical transmission, WO-A-2009/079049 discloses a helicopter comprising:
a main rotor;
a first electric motor for driving in rotation the main rotor;
a tail rotor; and
a second electric motor for driving the tail-rotor.

Electric motor are supplied by an on-board power source, such as a battery, an hybrid source of electricity or the like.

However, the on-board power source needs to be periodically re-charged.

In the recent years, the attention has been focused on environmental issues of air pollution and climate change.

As a consequence, a need is felt within the industry to re-charge the on-board power source by using renewable energy, in particular wind energy. Unfortunately, the wind energy is particularly difficult to collect because the orientation of wind current is variable.

Known convertiplanes also comprise mechanical brakes for slowing down and stopping the angular speed of rotors. However, mechanical brakes are heavy and comprise hydraulic system which are costly to maintain. Moreover, mechanical brakes dissipate as waste heat a large amount of energy.

A need is felt within the industry to brake the rotors without requiring costly and complex components and/or while reducing the amount of kinetic energy wasted as heat.

Furthermore, a need is felt to contain as far as possible the size and the weight of the nacelles.

A need is also felt to manufacture a modular convertiplane which may be easily fitted with different propulsion packages.

Known convertiplanes make also wide use of hydraulic actuating system, for example for tilting rotors and/or for actuating landing gear and/or for controlling the blades of the rotor. Hydraulic actuating systems require an oil tank on the convertiplane, are costly to maintain, generate a certain risk of fire and require that oil is disposed in the environment.

A need is felt to manufacture a convertiplane, which, as much as possible, overcome the drawbacks connected with the use of hydraulic actuating systems.

SUMMARY OF THE INVENTION

It is an object of the present invention to provide a convertiplane, designed to meet at least one of the above requirement in a straightforward, low-cost manner.

According to the present invention, there is provided a convertiplane, according to claim 1.

Furthermore, the present invention relates to a method of operating a convertiplane, according to claim 11.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
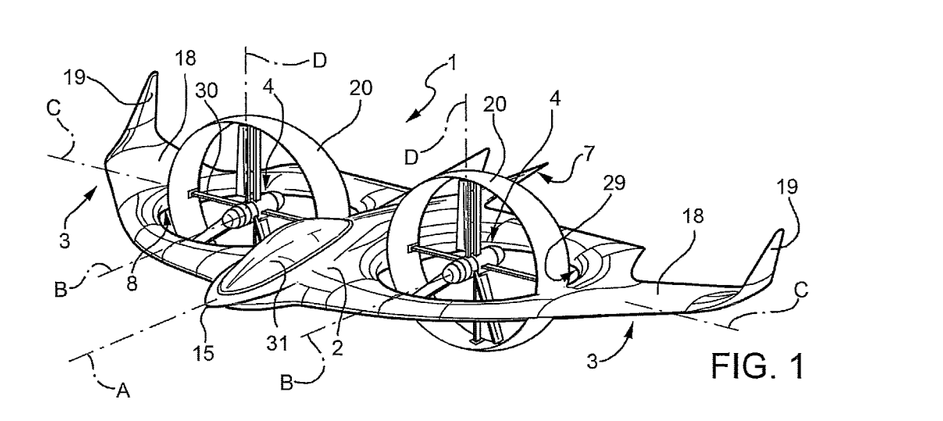
FIG. 1 is a perspective view of a convertiplane according to the invention in an airplane mode.
Figure 2:
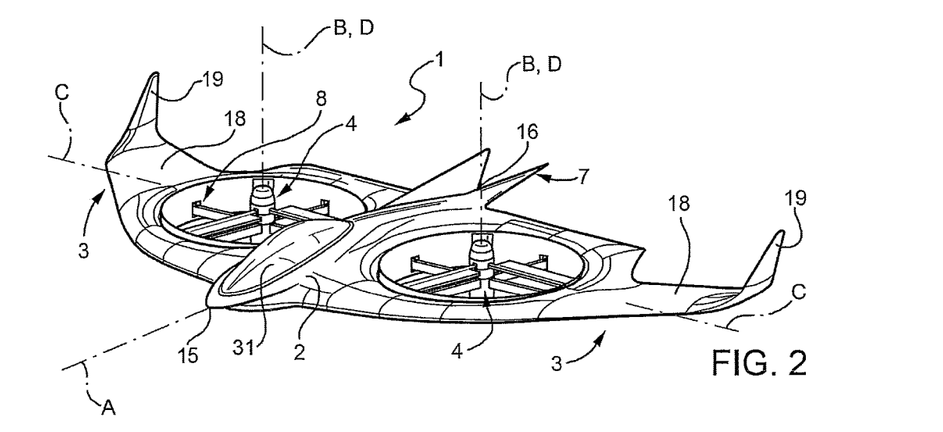
FIG. 2 is a perspective view of the convertiplane of FIG. 1 in a helicopter mode.
Figure 3:
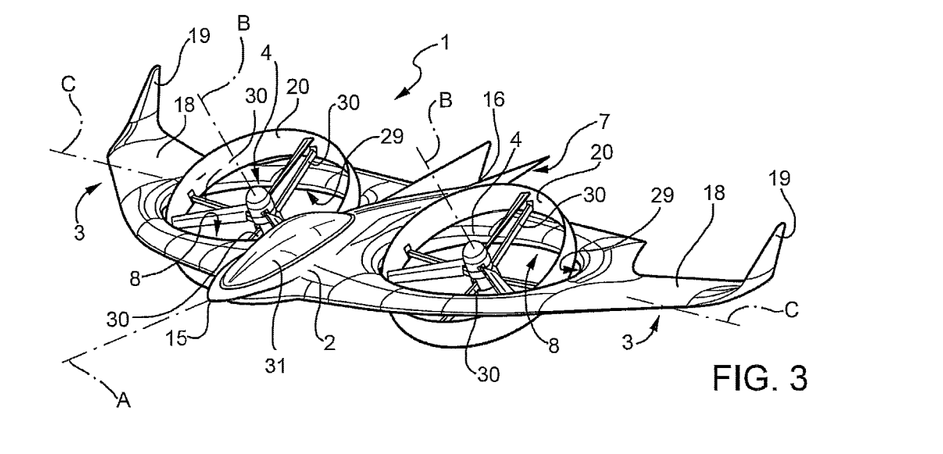
FIG. 3 is a perspective view of the convertiplane of FIGS. 1 and 2 in a transition mode between the helicopter and the aeroplane mode.

Number 1 in FIGS. 1 to 3 indicates as a whole a convertiplane, i.e. a hybrid aircraft capable of being selectively operated in an aeroplane mode (FIG. 1) or in a helicopter mode (FIG. 2).

Convertiplane 1 substantially comprises:
a fuselage 2 elongated along a longitudinal direction A of convertiplane 1;
a pair of semi-wings 3 which project on opposite respective lateral sides of fuselage 2; and
a pair of rotors 4.

In greater detail, fuselage 2 has a forward end 15 a backward end 16 which are opposite to each other, along direction A, and define opposite ends of convertiplane 1.

Fuselage 2 also comprises (FIG. 6):
a forward portion 12 housing a cockpit 31; and
a backward portion 13.

Each rotor 4 substantially comprises:
a housing 5;
a shaft 6 supported by housing rotatably about a relative axis B; and
an ogive 14 rotatably integral with shaft 6 about relative axis B.

Each rotor 4 also comprises a plurality of blades 27, three in the embodiment shown, which are articulated relative to shaft 6 through the interposition of a hub 28.

In detail, rotors 4 rotate about relative axes B in opposite directions. In this way, convertiplane 1 does not need an anti-rotation device.

Figure 9:
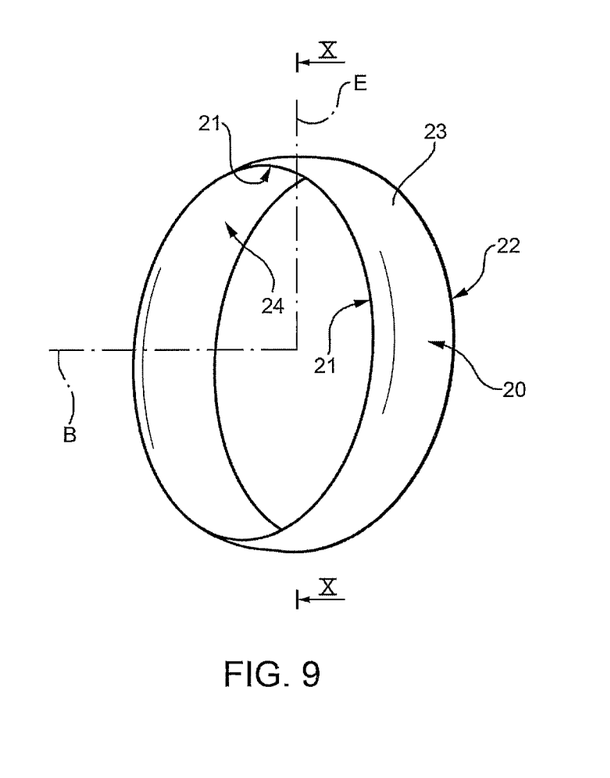
FIG. 9 is a perspective view of a further component of the convertiplane of FIGS. 1 to 4, with parts removed for clarity.

With reference to FIG. 9, the transversal section of fuselage 2 in a plane parallel to direction A and orthogonal to axis C is shaped as airfoil 35.

More precisely, airfoil 35 comprises:
a leading edge which is defined by end 15;
a trailing edge which is defined by end 16;
a topside 37 which joins ends 15, 16; and
a bottom side 38 which joins ends 15, 16 on the opposite side of topside 37.

Topside and bottom side 37, 38 are, in the embodiment shown both, convex.

Topside and bottom side 37, 38 are, in the embodiment shown, symmetrical relative to a rectilinear chord 39 which connects edges 15, 16.

Convertiplane 1 also comprises:
a V-shaped tail 7, which upwardly projects from portion 13 of fuselage 2; and
a plurality of landing gears 9 downwardly protruding from the bottom side of semi-wings 3.

Each rotor 4 may also tilt together with its respective axis B relative to respective semi-wing 3. In particular, rotor 4 and relative axis B tilt about a respective axis C which is orthogonal to direction A.

More precisely, axes B of rotors 4 are substantially orthogonal to direction A, when convertiplane 1 is operated in the helicopter mode (FIG. 2).

In this way, convertiplane 1 is a "so-called" tilt rotor convertiplane.

Axes B of rotors 4 are substantially parallel to direction A, when convertiplane 1 is operated in the aeroplane mode (FIG. 1).

Convertiplane 1 defines a pair of through openings 8 within which relative rotors 4 may tilt about relative axis C.

In particular, each semi-wing 3 defines a relative opening 8.
Each semi-wing 3 substantially comprises:
a leading edge 10; and
a trailing edge 11 opposite to edge 10 and interacting with air current after edge 10, when convertiplane 1 is advanced along direction A.

Leading edges 10 converge, on respective opposite sides, towards fuselage 2, when proceeding from V-shaped tail 7 to end 15.

More precisely, the distance measured parallel to axis C between edges 10 decreases proceeding from V-shaped tail 7 to end 15.

Each leading edge 10 comprises (FIGS. 4 and 5):
a first curved stretch 41 laterally projecting on a relative side of fuselage 2; and
a rectilinear stretch 42 which defines a prolongation of stretch 41 on the relative opposite side of fuselage 8.

Figure 4:
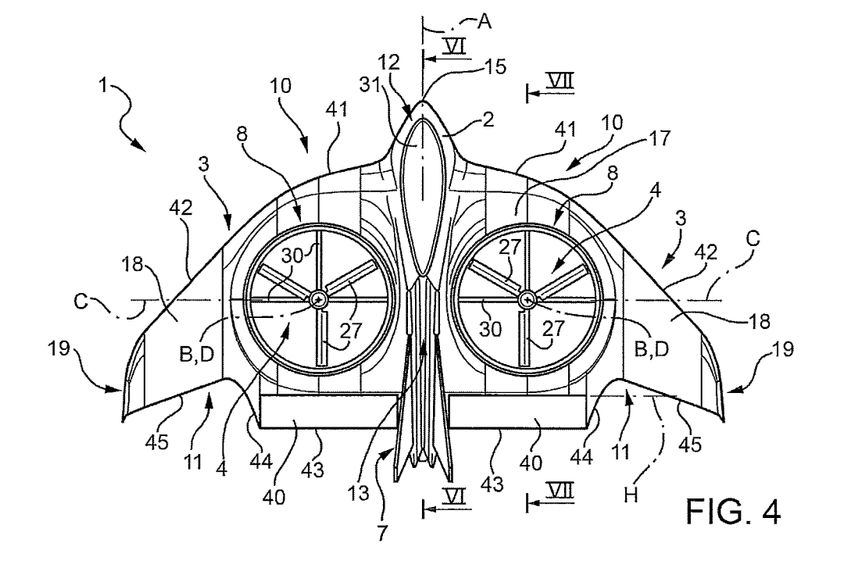
FIG. 4 is a top view of the convertiplane of FIGS. 1 to 3 in a first operative configuration.
Figure 5:
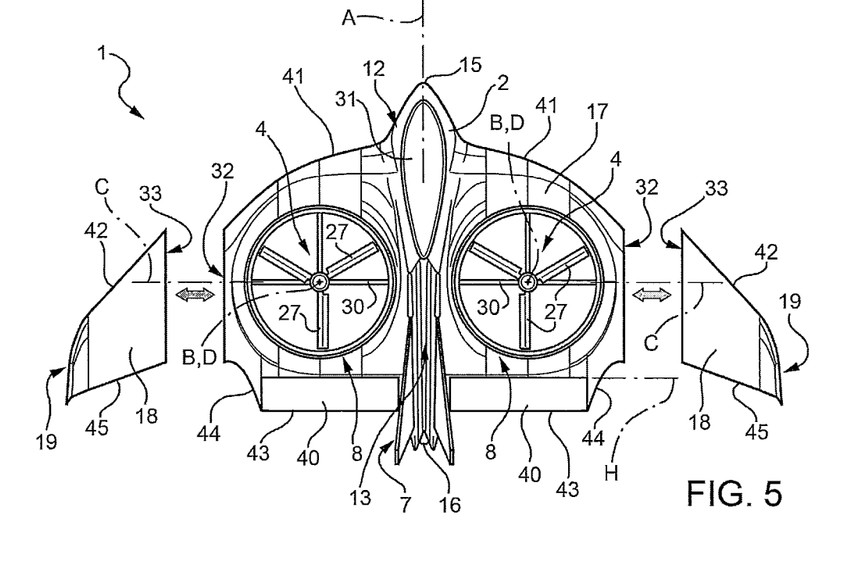
FIG. 5 is a top view of the convertiplane of FIGS. 1 to 3 in a second operative configuration.

Each trailing edge 11 comprises:
a rectilinear stretch 43 extending parallel to direction C and on a relative lateral side of V-shaped tail 7;
a curved stretch 44; and
a rectilinear stretch 45 opposite to stretch 44 relative to stretch 43 and inclined relative to direction C.

As a result of the conformation of trailing and leading edges 11, 10, semi-wings 3 are configured as "so-called" delta wings.

Corresponding edges 42, 45 protrude upwardly from a plane defined by direction A and axis C, so as to from relative winglets 19 which are arranged on respective opposite sides of fuselage 2.

Each opening 8 is arranged between fuselage 2 and relative winglet 19 parallel to relative axis C and is arranged between edges 10, 11 parallel to direction A.

Each opening 8 extends about an axis D and is, in the embodiment shown, circular.

Furthermore, each opening 8 has an edge 29, circular in the embodiment shown.

When convertiplane 1 is operated in the aeroplane mode (FIG. 1), axes B are orthogonal to respective axes D and rotors 4 protrudes from opposite, top and bottom, sides of relative openings 8.

When convertiplane 1 is operated in the helicopter mode (FIG. 2), axes B are parallel to respective axes D and rotors 4 are fully embedded within relative openings 8.

In particular, when convertiplane 1 is operated in the helicopter mode, the thickness of rotors 4 parallel to axes D is less than or equal to the thickness of relative openings 8 parallel to axes D.

Each semi-wing 3 comprises (FIGS. 4 and 5):
a body 17 which defines a relative opening 8; and
a pair of outboard wings 18 are detachably connected to body 17 on respective opposite sides of fuselage 2.

As a result, convertiplane 1 may be operated:
in a first configuration in which wings 18 are connected to and project, on opposite sides of fuselage 2, from body 17 (FIG. 4); and
in a second configuration, in which wings 18 are removed from body 17 (FIG. 5).

More precisely, body 17 comprises fuselage 2 and V-shaped tail 7 and openings 8.

Body 17 is bounded by stretches 41, stretches 43, and by a pair of walls 32 which lies on a plane orthogonal to axis C.

The cross section of body 17 in a plane orthogonal to axis C comprises a pair of airfoils 60, 65.

Airfoil 60 is bounded between leading edge 10 and a forward portion 47 edge 29 along direction A.

Airfoil 60 comprises a topside 61 and a bottom side 62 which join edge 10 and forward portion 47.

Airfoil 60 extends symmetrically about a rectilinear chord 63 which joins edge 11 and forward portion 47.

Topside and bottom side 61, 62 are, in the embodiment shown, both convex.

Airfoil 65 is bounded between a rearward portion 48 of edge 29 and trailing edge 11 along direction A.

Airfoil 65 comprises a topside 66 and a bottom side 67 which join rearward portion 48 and trailing edge 11.

Topside and bottom side 66, 67 are, in the embodiment shown, both convex.

Airfoil 65 extends symmetrically about a rectilinear chord 68 which joins edge 11 and rearward portion 48.

Each wing 18 comprises relative winglet 19 and is bounded by relative stretches 42, 45 on opposite sides.

Each wing 18 is also bounded by a wall 33 on the opposite side of relative winglet 19.

Wall 33 of each wing 18 is detachably connected to a relative wall 32 of body 17.

Each wing 18 is, in particular, backward swept to provide roll stability and reducing wing span for obtaining a given amount of lift.

Convertiplane 1 also comprises pair of elevons 40 which are arranged on respective stretches 45 and on respective sides of V-shaped tail 7.

Elevons 40 are hinged to body 17 about an axis H parallel to axis C. In this way, elevons 40 may move upwardly and downwardly relative to body 17 for controlling the pitch and the roll during horizontal flight.

Due to the fact that rotors 4 protrude from semi-wings 3, when convertiplane 1 is operated as an aircraft, the airflow speed acting on elevons 40 is particularly high, so increasing the effectiveness of elevons 40.

Each rotor 4 comprises:
an annular shroud 20 which ducts relative blades 27; and
a plurality of spokes 30 which are, on relative opposite edges, interposed between relative shroud 20 and housing 5.

In this way, shroud 20 and spokes 30 rotate integrally with blades 27 of each rotor 4 about relative axis C, when convertiplane 1 moves from helicopter and aeroplane mode and vice-versa.

On the contrary, shroud 20 and spokes 30 are fixed relative to axis B of each rotor 4.

Figure 10:
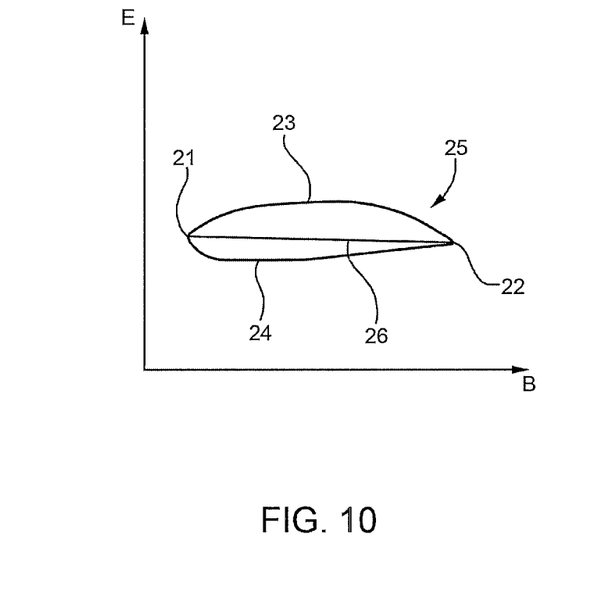
FIG. 10 is a cross section of the fourth component taken along line X-X of FIG. 9.

More in detail, each shroud 20 extends about relative axis B and has a thickness about a relative axis E orthogonal to relative axis B (FIGS. 9 and 10).

Each shroud 20 comprises:
leading and a trailing edges 21, 22 which are opposite to each other along direction B;
a topside 23 which joins edges 21, 22; and
a bottom side 24 opposite to topside 23 and which joins edge 21, 22.

Figure 6:
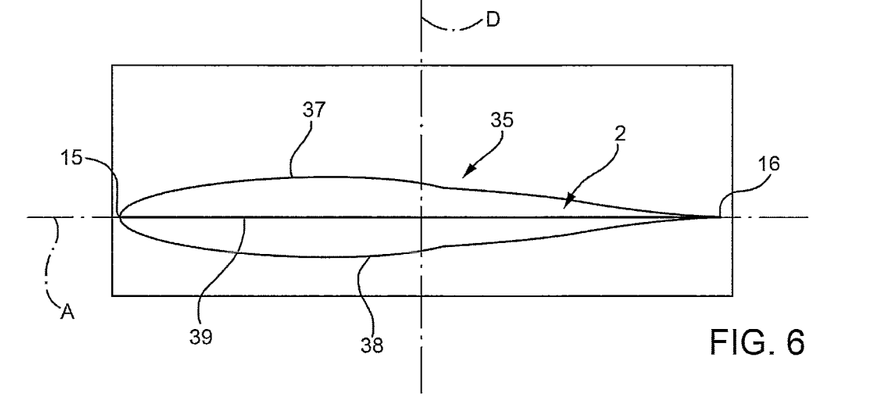
FIGS. 6 and 7 are cross sections of first components of FIG. 4 taken along lines VI-VI and VII-VII respectively of FIG. 6.
Figure 7:
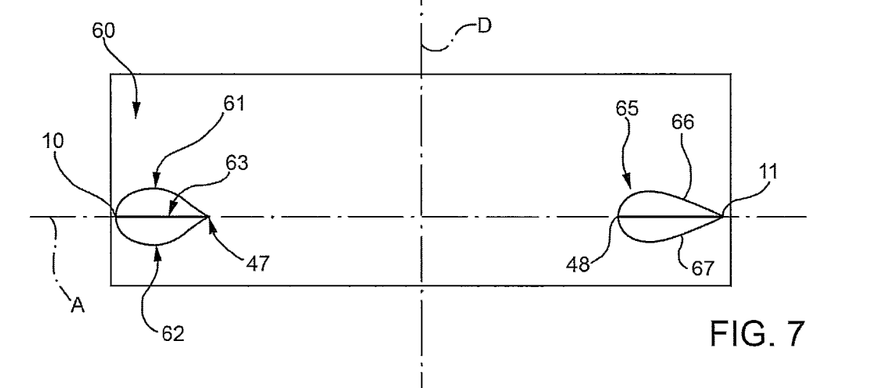
Figure 8:
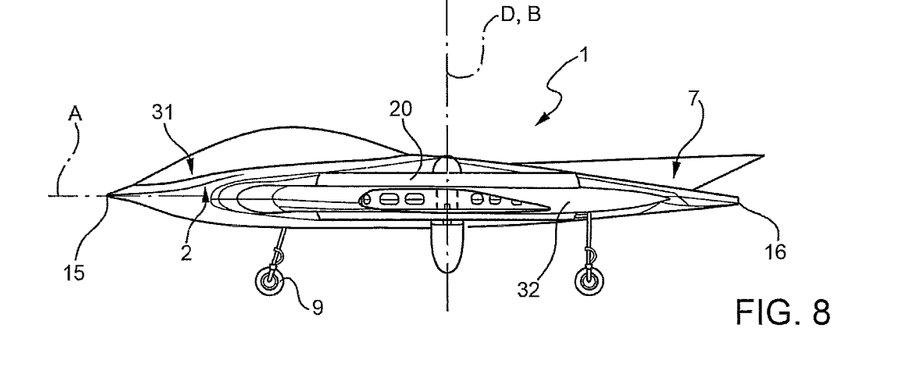
FIG. 8 is a lateral view of the convertiplane of FIGS. 1 to 3 in the second operative configuration.

As evident from FIGS. 6 and 7, the cross section of shroud 20 taken in the plane defined by relative axes E, B is configured as an airfoil 25.

In other words, topside 23 and bottom side 24 are antisymmetrical relative to a chord 26 which joins leading and trailing edges 21, 22.

In detail, both topside 23 and bottom side 24 are convex.

Furthermore, the thickness of airfoil 25, i.e. the distance between topside 23 and bottom side 24 measured along direction F, at first increases and then decreases, proceeding from leading edge 21 to trailing edge 22.

Rotors 4 about relative axes may tilt independently of each other.

Figure 11:
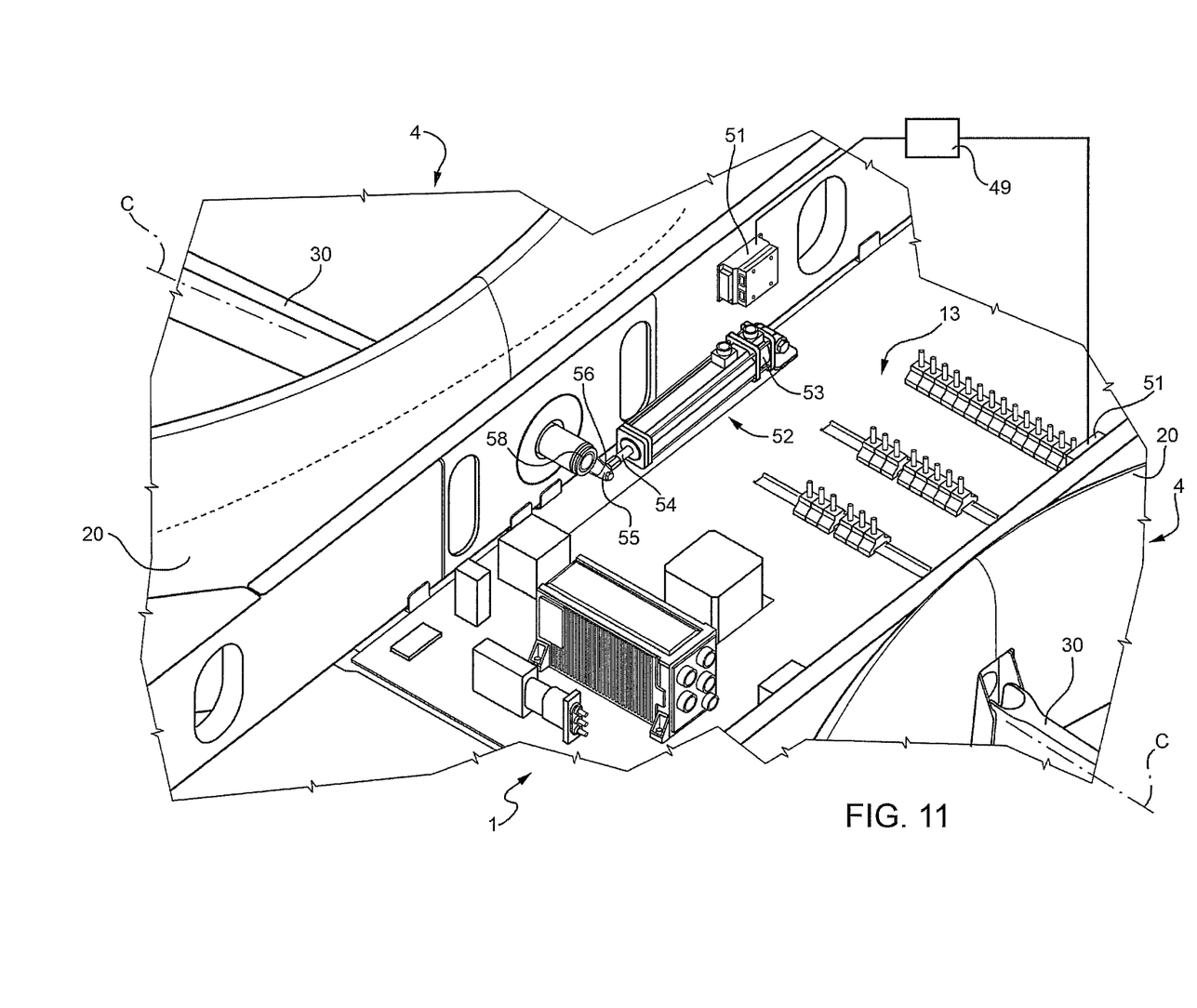
FIGS. 11 to 17 are perspective view of respective components of the convertiplane of FIGS. 1 to 4, with parts removed for clarity.

In detail, convertiplane 1 comprises:
a pair of actuators 52 operatively connected to relative rotors 4 and adapted to tilt rotors 4 about relative axes C; and a flight control system 49 (only schematically shown in FIG. 11) adapted to control actuators 52 independently from each other, so that rotors 4 may tilt about relative axes C independently from each other.

Each actuator 52 comprises, in turn,
a fixed part 53;
a ram 54 which may slide parallel to direction A relative to part 53; and
a rod 55 having a first end 56 hinged to ram 54 about an axis parallel to axis C, and end 58 which integrally tilts together with shroud 20 of rotor 4 about axis C.

Each actuator 52 also comprises a control unit 51 for controlling the movement of ram 54 parallel to direction A.

Control units 51 are, in turn, controlled by flight control system 49 on the basis of a plurality of flight and mission parameters.

The movement of ram 54 relative to fixed part 53 is caused by an electric motor (not-shown).

Furthermore, each actuator 52 comprises a bar 59 which extends parallel to relative axis C.

Bar 59 of each actuator 52 comprises (FIGS. 11 and 12):
an end 90 integral with end 58 of rod 55; and
an end 91 opposite to end 90 and fitted to shroud 20.

Figure 12:
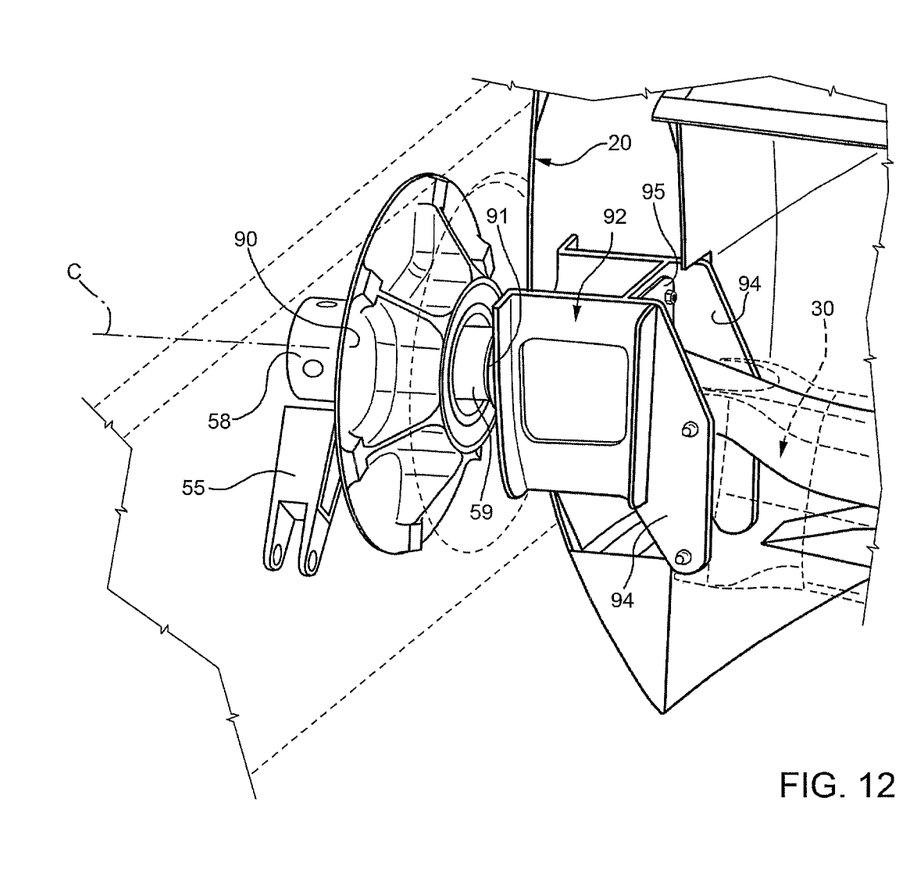

More precisely, convertiplane 1 comprises a plurality of connecting elements 92 (only one of which is shown in FIG. 12) for connecting relative spokes 30 to shroud 20.

In detail, each connecting element 92 comprises a pair of walls 94 fitted to relative spoke 30, and a central portion 95 fitted to a peripheral portion of shroud 20 and coupled with end 91 of bar 59.

In particular, each end 91 and corresponding central portion 95 are coupled by using a splined fitting.

In detail, central portions 95 and ends 91 of bars 59 are partially housed within a cavity defined by shroud 20 (FIG. 12).

Starting from helicopter mode, each actuator 52 may tilt relative rotor 4 towards end 15 or towards end 16.

In other words, during the transition from helicopter to airplane mode, each actuator 52 may tilt relative rotor 4 forward or rearwards relative to axis D.

Advantageously, convertiplane 1 comprises (FIGS. 13 to 16):
an electrical power storage device 70; and
two pairs of electric machines 71;

each electric machine 71 comprises, in turn, a stator 72 electrically connected to storage device 70, and a rotor 73 which is connected to shaft 6 of relative rotor 4;

each electric machine 71 may be operated as:
an electric motor to directly drive in rotation relative shaft 6 about relative axes B, by using the electrical power stored in storage device 70; or
as an electrical power generator for re-charging storage device 70, by causing the rotation of rotor 4 using wind energy.

In detail, convertiplane 1 may be arranged in the aeroplane mode, after that the landing has been completed, with rotors 4 tilted so as to face the main direction of the wind current.

In such a condition, the wind current acting on blades 27 causes the rotation of shaft 6.

Accordingly, electrical machines 71 generate electrical current which is stored within storage device 70.

In particular, rotors 73 are directly connected to shafts 6.

In the present description, the expression "directly connected" is used to indicate that no transmission system is interposed between rotor 73 and shaft 6. Accordingly, the angular speed about axes B of shaft 6 and relative rotors 73 is equal.

In detail, when electric machines 71 are operated as electric motors, they are fed with electrical current by storage device 70.

Figure 13:
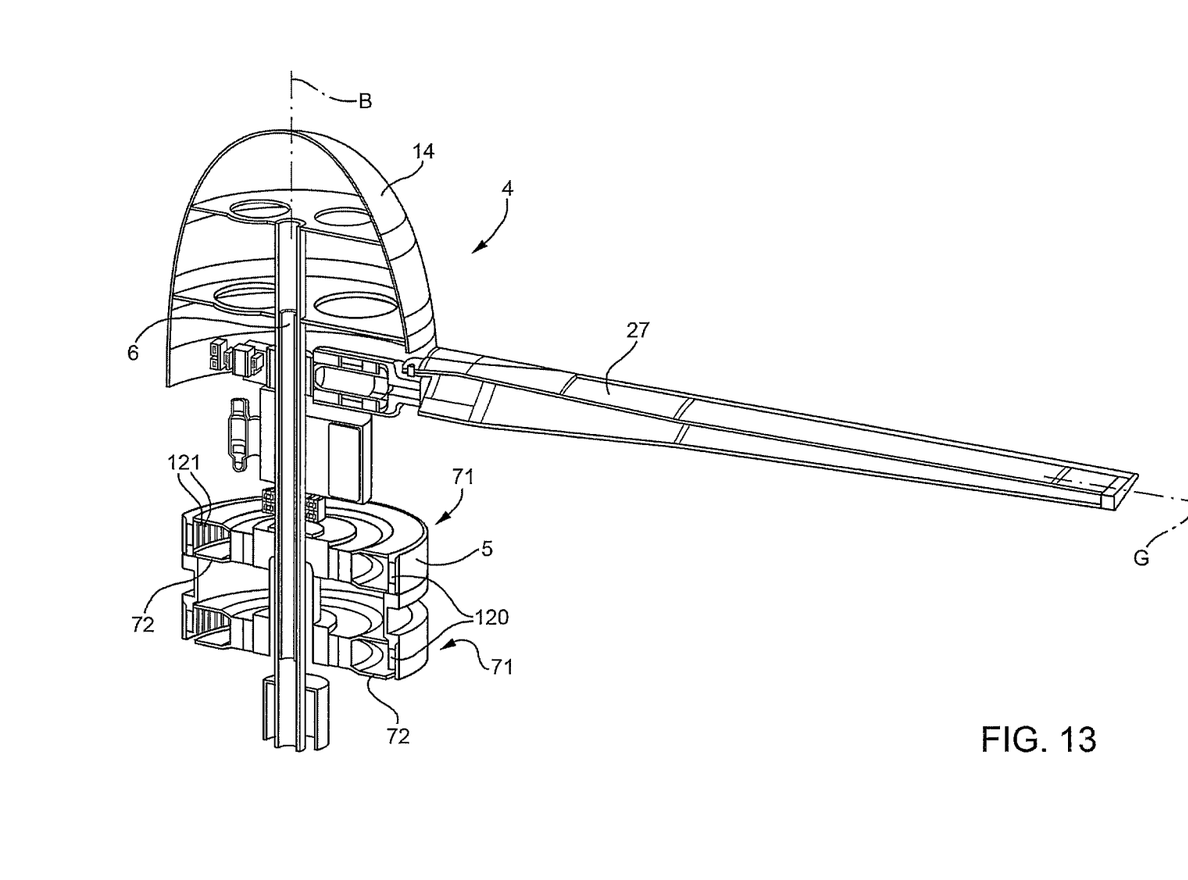

In detail, stator 72 of each electric machine 71 is fitted within housing 5 of relative rotor 4; and rotor 73 of each electric machine 71 is rotatably supported by stator 72 (FIG. 13).

Stator 72 of each electric machine 71 comprises an annular body 120 elongated along relative axes B and defining a plurality of angularly-spaced seats 121. In particular, seats 121 of each electric machine 71 extend radially relative to respective axis B.

Figure 14:
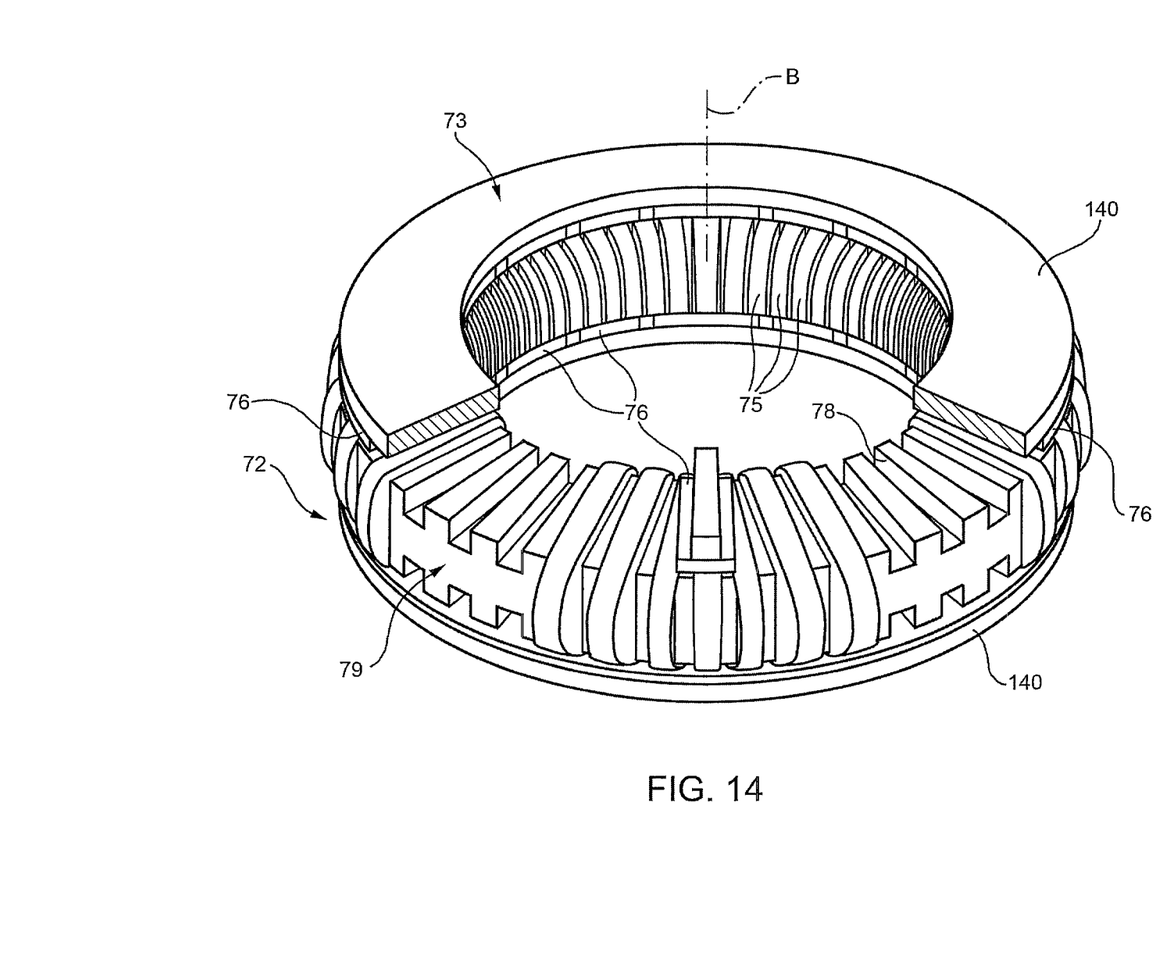

Stator 72 also comprises a magnetic core 79 which defines a helical slot 78 (not shown in FIG. 13, but only in FIG. 14).

Core 79 is housed within body 120 and slot 78 is annular relative to axis B.

Rotor 73 of each electric machine 71 comprises a pair of annular plates arranged on relative opposite axial sides of relative stator 72.

Electric machines 71 are, in the embodiment shown, axial flux brushless electric machines, i.e. of the type that generates a magnetic flux predominantly extending about axis B.

Each electric machine 71 also comprises:
a plurality of coils 75 which are wound on core 79, housed within slot 78, and are fed, in use, with alternate current by storage device 70; and
a plurality of permanent magnets 76 which are angularly integral with rotor 73 and axially interposed between plates of rotors 73 and body 120, so as to be driven in rotation about relative axis B by the magnetic field generated by coils 75.

Permanent magnets 76 of each electric machine 71 are angularly equi-spaced about relative axis B.

Electric machines 71 of each rotor 4 are arranged in series in relation to shaft 6. In other words, the overall torque to which shaft 6 is subjected about axis B equals the sum of torques exerted by each electric motor 71.

Coils 75 are electrically connected to storage device 70 by using wires.

Storage device 70 may comprise (FIGS. 15 and 16):
either one or more electrical battery 81; or
a hybrid battery 82 and an internal combustion engine 83 operatively connected with said hybrid battery 82.

Figure 15:
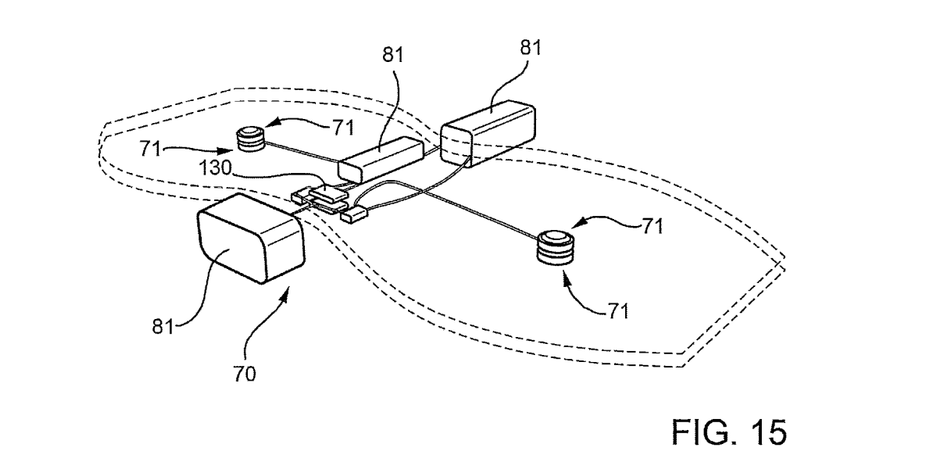

In the embodiment shown in FIG. 15, internal combustion engine 83 recharges hybrid battery 82. In particular, internal combustion engine 83 is a Diesel engine and comprises a tank 84.

Convertiplane 1 is therefore formed by:
a common core which comprises, in turn, semi-wings 3, fuselage 2, rotors 4 and electrical machine 71; and
a module comprising storage device 70, which may be selectively connected to said common core.

Storage device 70 is, in the embodiment shown, a Li-Ion battery.

Convertiplane 1 also comprises a motor controller 130 (FIGS. 15 and 16) which receives electrical power from storage device 70 and regulates the power input into electrical machines 71 to control the motion of shafts 6 of rotors 4.

Figure 16:
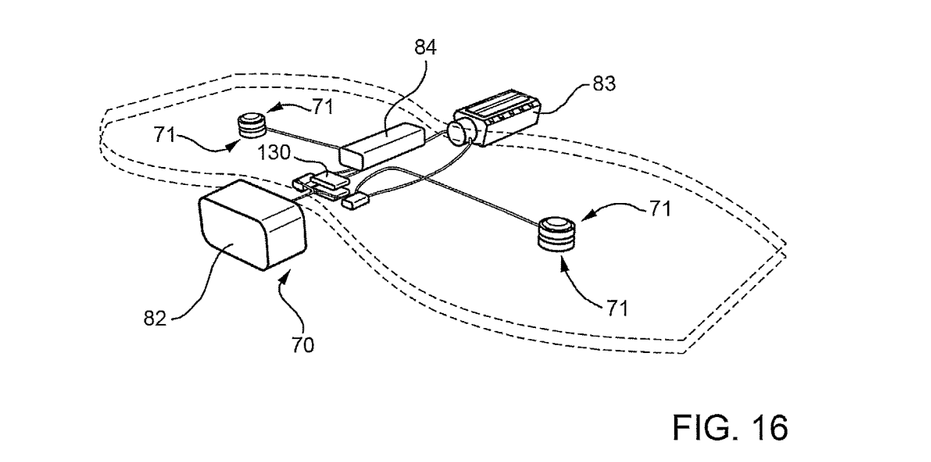

In detail, motor controller 130 is fed by storage device 70 with a continuous current, converts this continuous current into alternate current and feeds electrical machines 71 with alternate current.

Electric machines 71 may also be operated as an electrical generator during a braking phase of relative shaft 6, especially when convertiplane 1 is on ground after landing.

In this condition, electrical machines 71 generate electrical current which is used for re-charging battery 81 or battery 82. In other words, electrical machines 71, when operated as an electrical generator, define braking means for slowing down shafts 6 of relative rotors 4.

Actuators 52 and battery 81 (or 82) are arranged in portion 13 of fuselage 2.

Fuselage 2 may house a payload pallet and/or a sensor package.

Figure 17:
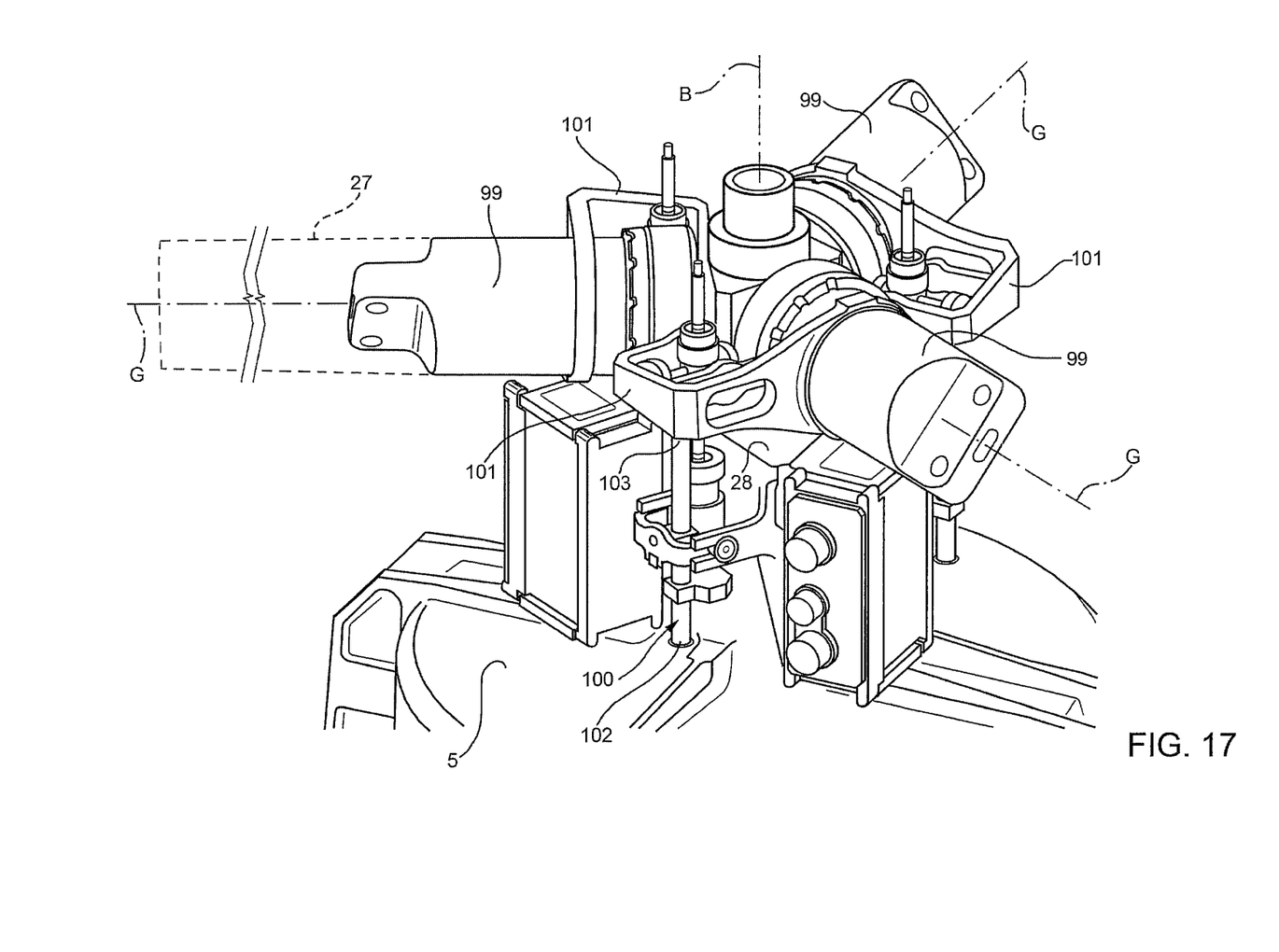

Convertiplane 1 also comprises (FIG. 17), for each rotor 4, three variable-length actuators 100 which are interposed between housing 5 and relative blades 27 (FIG. 17).

In detail, each blade 27 (only schematically shown in FIG. 17) extends along a relative axis G and is connected to hub 28 by a relative root connecting element 99.

Each connecting element 99 comprises a C-shaped appendix 101 which is eccentric relative to respective axis G.

Each actuator 100 has a first end 102 connected to housing 5 and a second end 103 connected to appendix 101 of relative blade 27.

End 103 of each actuator 100 may also slide relative to end 102.

In this way, actuators 100 cause the rotation of relative blades 27 about relative axis G.

Accordingly, the angle of attack of each blade 27 is varied.
In particular, actuators 100 may both vary:
the angle of attack of all relative blades 27, i.e. the so-called "collective pitch"; and
the cyclical variation of the angles of attack of relative blades 27 during their rotation about axis B, i.e. the so-called "cyclic pitch".

Each actuator 100 may also be used for exerting a given force onto relative blade 27, so as to suppress the vibration of this blade 27.

In the embodiment shown, actuators 100 are electro-mechanical. In other words, they do not comprise hydraulic circuits or oil tank.

Convertiplane also comprises:
a further (not-shown) first actuator for controlling the inclination of elevons 40; and/or
a further second actuator (not-shown) fro controlling the movement of landing gears 9.

First and second actuators are also completely electro-mechanical actuators.

The operation of convertiplane 1 is described starting from a situation in which convertiplane 1 is operated in the helicopter mode and wings 18 are connected to body 17, which is formed by fuselage 2 and semi-wings 3.

This configuration is typical of the taking off and/or the landing of convertiplane 1.

Wings 18 are connected to body 17 when an increased value of lift is required.

In particular, when convertiplane 1 is operated in the helicopter mode, axes B are orthogonal to direction A and parallel to axes D. Furthermore, rotors 4 and relative shrouds 20 are fully embedded within relative openings 8. In other words, the thickness of rotors 4 and shrouds 20 is contained within the size of relative openings 5 parallel to corresponding axes D.

Rotors 4 rotate about relative axes C in opposite direction relative to each other, so that the torques exerted by rotors 4 on convertiplane 1 are balanced.

In detail, shaft 6 of each rotor 4 is driven in rotation about relative axis B by relative pair of electric machines 71 which are operated, in this case, as electric motors.

Very briefly, coils 75 are fed with alternate current by storage device 70 and generate a variable magnetic flux on permanent magnets 76.

As a result, permanent magnets 76 and, therefore, rotor 73 and shafts 6 are driven in rotation about relative axis B.

Actuators 100 are used for both:

varying the angle of attack of all relative blades 27, thus varying the so-called "collective pitch"; and/or varying the cyclical variation of the angles of attack of relative blades 27 during their rotation about axis B, thus varying the so-called "cyclic pitch".

When convertiplane 1 is operated in the helicopter mode, the yawing is controlled by tilting one rotor 4 towards end 15 of fuselage 2 and other rotor 4 towards end 16 of fuselage 2.

In this way, rotors 4 generate respective forces parallel to direction A which are equal and opposite to each other. As a result, convertiplane 1 may yaw.

In detail, flight control system 49 control actuators 52 which tilt relative rotors 4 about relative axes C and independently of each other.

Each control unit 51 controls the sliding of ram 54 parallel to direction A.

The translation of rams 54 causes the rotation of rods 55, and, therefore of relative rotors 4 and shrouds 20 about relative axes C.

When it is necessary to operate convertiplane 1 in the aeroplane mode, actuators 52 tilt rotors 4 and relative shrouds 20 about relative axes C and towards end 15.

When convertiplane 1 is operated in the aeroplane mode, rotors 4 and shrouds 20 protrude in part above relative semi-wings 3 and in part below semi-wings 3.

In this way, the airflow generated by rotors 4 impinges both the portion of semi-wings 3 arranged below rotors 4 and elevons 40.

Furthermore, convertiplane 1 flies, when operated in the aeroplane mode, with its direction A slightly inclined relative to a horizontal plane, so that air current defines a not null angle with chords 39, 63, 68 of airfoils 36, 60, 65.

The majority of the lift is provided by wings 18. The remaining part of the lift is provided by fuselage 2 and shrouds 20 which duct relative rotors 4.

Winglets 19 increase the overall aerodynamic efficiency of convertiplane 1.

During horizontal flight, the roll and the pitch is controlled by rotating elevons 40 about axis H. In detail, elevons 40 may be controlled independently of each other.

V-shaped tail 7 ensures longitudinal stability in the horizontal flight, thanks to not-shown movable vertical surfaces.

Rotors 4 can be braked after landing when the aircraft is on ground by operating electrical machines 71 as alternate current electrical generator, instead of electric motor.

In this way, the deceleration of rotors 4 and, therefore, of shafts 6 recharges batteries 81 (or 82).

In case that the mission profile requires convertiplane 1 mostly to be operated in the helicopter mode, wings 18 are detached from body 17, without changing the previously described operation of convertiplane 1.

When convertiplane 1 is operated in the aeroplane mode, it can be moved rearwards, by tilting both rotors 4 towards end 16 and with axes B substantially parallel to direction A.

When convertiplane 1 is on ground and storage device 70 needs to be re-charged, rotors 4 are tilted about relative axes C in a direction facing the wind current.

At this stage, the wind current drives in rotation shafts 6 of rotors 4, which in turn, cause the rotation of rotors 73 of electrical machines 71 relative to stators 72.

In other words, electrical machines 71 are operated as electrical power generators which re-charge storage device 70.

The advantages of convertiplane 1 according to the present invention will be clear from the foregoing description.

In particular, on one side convertiplane 1 does not require heavy and complex mechanical transmission. On the other side, batteries 81, 82 may be re-charged by using a renewable source of energy, like wind energy.

As a matter of fact, when the convertiplane 1 is on ground, rotors 4 may be titled about axes C facing the direction of the wind.

In this condition, the wind current drives in rotation shafts 6 of rotors 4, which in turn, causes the rotation of rotors 73 of electrical machines 71 relative to stators 72.

As a consequence, electrical machines 71 are operated as electrical power generator and the electrical batteries 81, 82 are re-charged by using a renewable energy, like wind energy.

It is important to mention that batteries 81, 82 may be efficiently re-charged by using wind energy, because rotors 4 may tilt about relative axes C and therefore may be selectively arranged in an optimal position for collecting energy from wind.

On the contrary, the rotor of the helicopter disclosed in the introductory part of the present description cannot tilt but simply rotates about its own fixed axis. As a result, this rotor cannot be selectively arranged in a given optimal position from collecting energy from wind, thus rendering the wind energy collection practically unfeasible.

Furthermore, electric machines 71 are used as power electric generators also when the rotational speed of rotors 4 need to be slowed down, for example after landing when convertiplane 1 is on ground.

In this way, convertiplane 1 no longer requires a heavy and complex mechanical brake, and a large amount of energy is no longer dissipated as waste heat when rotors 4 are braked. Furthermore, the electrical power generated by electrical machine 71 during the braking is used for re-charging batteries 81, 82.

Shaft 6 of each rotor 4 is directly connected to two rotors 73 of relative electrical machines 71. In other words, two electrical machines 71 are arranged "in series" with reference to each shaft 6.

In this way, convertiplane 1 offers redundancy in case of failure of one of electrical machine 71. As a matter of fact, in this case, the power provided by the remaining electrical machine 71 is enough to allow convertiplane 1 to glide in the aeroplane mode.

Furthermore, being two electrical machines 71 directly driving in rotation the same shaft 6, the diameter of stators 72 may be reduced.

In addition, electrical machines 71 are axial-flux electrical machine. As a consequence, the ratio between the power generated and the weight is particularly high.

Electrical machines 71 may be fed by an electrical batter 81 or by a hybrid battery 82.

In this way, convertiplane 1 may be easily and selectively switched from an all-electric configuration to a hybrid diesel-electric configuration.

Finally, actuators 52, 100 and further actuators for controlling elevons 40 and landing gear 9 are all electro-mechanical actuators, without any hydraulic component.

Accordingly, the overall weight and the maintenance cost of convertiplane 1 are dramatically reduced.

Clearly, changes may be made to convertiplane 1 as described and illustrated herein without, however, departing from the scope of the present invention as defined in the accompanying Claims.

In particular, convertiplane 1 could comprise only one rotor 4 which may tilt about axis C within only one opening 8. In this case, a not-shown anti-rotation device would be present in convertiplane 1.

The invention claimed is:

1. A convertiplane (1) comprising:
   a pair of semi-wings (3);
   at least one first rotor (4) comprising a shaft (6) which may rotate about relative first axis (B) and tilt about a second axis (C) together with said first axis (B) with respect to said semi-wings (3) between a helicopter mode and an aeroplane mode;
   said first axis (B) being, in use, transversal to a longitudinal direction (A) of said convertiplane (1) in said helicopter mode and being, in use, substantially parallel to said longitudinal direction (A) in said aeroplane mode;
   characterized by comprising:
   at least one first actuator (52), which is adapted to control the tilting of said first rotor (4) about relative second axis (C);
   a flight control system (49) for controlling said actuator (52);
   an electrical power storage device (70; 81, 82); and
   at least one electrical machine (71);
   said actuator (52) comprising, in turn:
   a fixed part (53);
   a ram (54), which may slide parallel to said longitudinal direction (A) relative to said fixed part (53);
   a rod (55) having a first end (56) hinged to said ram (54) about an axis parallel to said second axis (C), and a second end (58) which integrally tilts with said rotor (4);
   a control unit (51), which controls the movement of said ram (54) parallel to said longitudinal direction (A) and is controlled by control system (49) on the basis of a plurality of flight and mission parameters;
   said electrical machine (71) comprising, in turn:
   a stator (72) which is electrically connected to said storage device (70; 81, 82); and
   a second rotor (73) which is operatively connected to a shaft (6) of said first rotor (4);
   said electrical machine (71) being operable as:
   an electric motor for driving in rotation said first rotor (4) by using the electrical power stored in said storage device (70; 81, 82); or
   as an electrical power generator for re-charging said storage device (70; 81, 82) by causing the rotation of said first rotor (4) under the action of a wind current, when said convertiplane (1) is on ground in said aeroplane mode and said storage device (70; 81, 82) needs to be re-charged;
   said first rotor (4) being tiltable about said second axis (C) in a direction facing the wind current, when said convertiplane (1) is on ground in said aeroplane mode and said storage device (70; 81, 82) needs to be re-charged;
   said wind-current driving in rotation said shaft (6) of said first rotor (4), which, in turn, causes the rotation of said second rotor (73) of said electrical machine (71) relative to said stator (72), when said convertiplane (1) is on ground in said aeroplane mode;
   said flight control system (49) comprising detecting means for detecting said direction facing the wind and controlling said control unit (51) of said actuator (52), so as to tilt said first rotor (4) in said direction facing the wind, when said convertiplane (1) is on ground in said aeroplane mode.

2. Convertiplane according to claim 1, characterized in that said shaft (6) and said first rotor (4) are directly connected to each other.

3. Convertiplane according to claim 1, characterized in that said electrical machine (71) defines, when operated as electrical power generator, braking means to slow down said rotational of motion of first rotor (4) while charging said storage device (70).

4. Convertiplane according to claim 1, characterized in that said electrical machine (71) is an axial flux electrical machine which generates, in use, a magnetic flux with a main component parallel to said first axis (B).

5. Convertiplane according to claim 1, characterized in that said electrical machine (71) is a brushless electric machine.

6. Convertiplane according to claim 1, characterized in that said electrical machine (71) comprises:
   at least one permanent magnet (76) integrally movable with said second rotor (73); and
   at least one coil (75) fitted to said stator (72), magnetically coupled with said permanent magnet (76) and which may be electrically fed by said storage device (70; 81, 82).

7. Convertiplane according to claim 6, characterized by comprising two said electrical machines (71) comprising relative first rotors (4) which are directly connected to said shaft (6) of said first rotor (4).

8. Convertiplane according to claim 1, characterized by comprising:
   a common core comprising said first rotor (4) and said electric machine (71); and
   a module comprising said storage device (70; 81, 82) which may be selectively connected to said common core;
   said storage device (70; 81, 82) comprising:
   either an electrical battery (81); or
   a hybrid battery (82) and an internal combustion engine (83) operatively connected with said hybrid battery (82).

9. Convertiplane according to claim 8, characterized in that said internal combustion engine (83) is a Diesel engine.

10. Convertiplane according to claim 1, characterized by comprising:
    a plurality of blades (27) articulated relative to said shaft (6); and/or
    at least one elevon (40) movable relative to said semi-wings (3); and/or
    at least one landing gear (9) which may extended or withdrawn; and/or
    at least one second actuator (100) for varying the position of a relative said blade (27) of said first rotor (4) relative to said shaft (6); and/or
    at least one third actuator for controlling the position of said elevon (40) relative to said semi-wings (3); and/or
    at least one further fourth actuator for controlling the extension/withdrawal of said landing gear (9);
    at least one of said first, second, third and fourth actuator (100, 52) being an electro-mechanical actuator.

11. A method of operating a convertiplane (1); said convertiplane (1) comprising:
    a pair of semi-wings (3);
    at least one first rotor (4) which may rotate about relative first axis (B) and tilt about a second axis (C) together with said first axis (B) with respect to said semi-wings (3) between a helicopter mode and an aeroplane mode;

said first axis (B) being, in use, transversal to a longitudinal direction (A) of said convertiplane (1) in said helicopter mode and being, in use, substantially parallel to said longitudinal direction (A) in said aeroplane mode;

said method being characterized by comprising the steps of:

operating an electrical machine (71) as an electric motor for driving in rotation said first rotor (4) by using the electrical power stored in an electrical power storage device (70; 81, 82); and operating said electrical machine (71) as an electric power generator for re-charging said storage device (70; 81, 82);

said step of operating said electrical machine (71) as an electric power generator comprising the step of using wind energy for driving in rotation said first rotor (4) when said convertiplane (1) is on ground in said aeroplane mode;

said convertiplane (1) comprising:

at least one actuator (52), which is adapted to control the tilting of said first rotor (4) about relative second axis (C);

a flight control system (49) for controlling said actuator (52);

said actuator (52) comprising, in turn:

a fixed part (53);

a ram (54), which may slide parallel to said longitudinal direction (A) relative to said fixed part (53);

a rod (55) having a first end (56) hinged to said ram (54) about an axis parallel to said second axis (C), and a second end (58) which integrally tilts with said rotor (4);

a control unit (51), which controls the movement of said ram (54) parallel to said longitudinal direction (A) and is controlled by control systempluralityof flight and mission parameters;

said electrical power storage device (70; 81, 82); and said at least one electrical machine (71);

said electrical machine (71) comprising, in turn:

a stator (72) which is electrically connected to said storage device (70; 81, 82); and a second rotor (73) which is operatively connected to said first rotor (4);

characterized by comprising the step of tilting said first rotor (4) of a given angle about said second axis (C) before said step of operating said electrical machine (71) as an electric motor, when said convertiplane (1) is on ground in said aeroplane mode and said storage device (70; 81, 82) needs to be re-charged;

said given angle being associated to a main direction of the wind-current;

said wind-current driving in rotation said shaft (6) of said first rotor (4), which, in turn, causes the rotation of said second rotor (73) of said electrical machine (71) relative to said stator (72), when said convertiplane (1) is on ground in said aeroplane mode;

said flight control system (49) detecting said direction facing said wind current and controlling said control unit (51) of said actuator (52) so as to tilt said first rotor (4) in said direction facing said wind current, when said convertiplane (1) is on ground in said aeroplane mode.

12. The method of claim 11, characterized in that said step of operating said electrical machine (71) as an electric power generator comprises the step of braking said first rotor (4).

* * * * *